Nov. 13, 1951     G. H. VOKES     2,575,148
DUST COLLECTOR FILTER
Filed Sept. 12, 1949     3 Sheets-Sheet 1
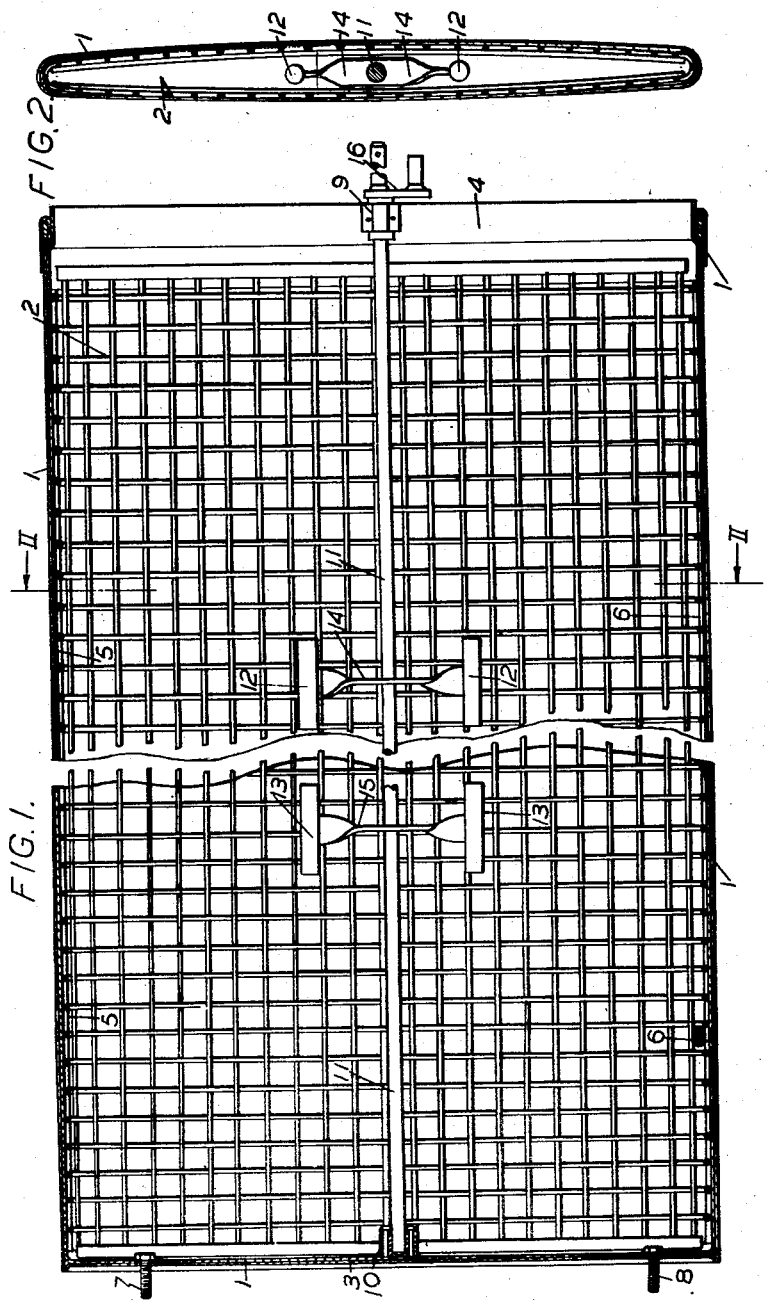
Inventor
Gordon H. Vokes
By
Attorney

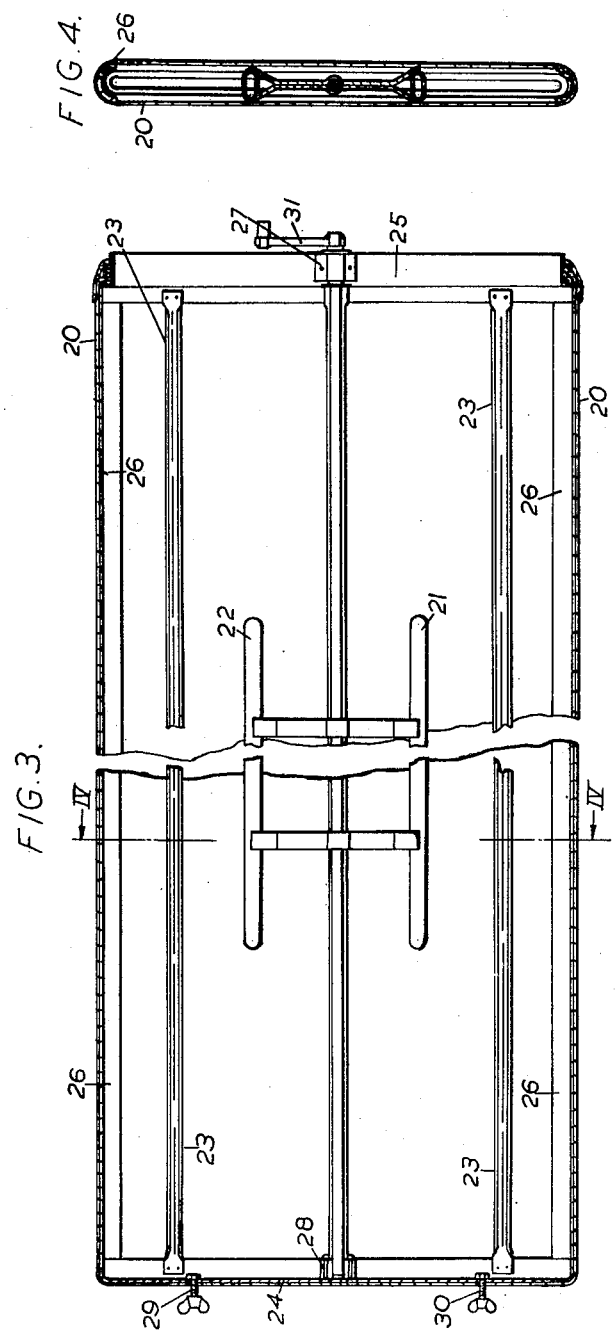

Nov. 13, 1951 G. H. VOKES 2,575,148
DUST COLLECTOR FILTER
Filed Sept. 12, 1949 3 Sheets-Sheet 3
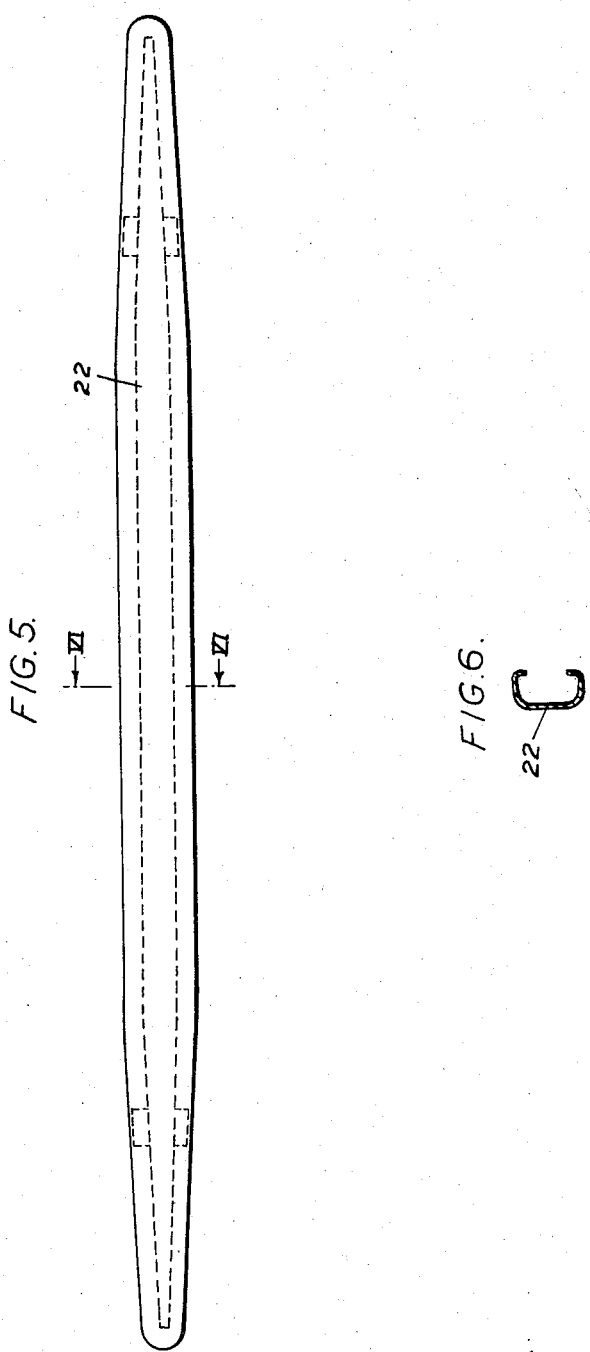
Inventor
Gordon H. Vokes
By
Attorney Patented Nov. 13, 1951

2,575,148

UNITED STATES PATENT OFFICE 2,575,148

DUST COLLECTOR FILTER

Gordon H. Vokes, Guildford, England, assignor to Vokes Limited, Guildford, England Application September 12, 1949, Serial No. 115,125
In Great Britain September 28, 1948

4 Claims. (Cl. 183—59)

This invention relates to dust collector filters of the kind in which bags of filtering material supported upon frames have their outer surfaces exposed to a flow of dust laden air or gas and which are periodically cleaned by beating the bags mechanically with the flow temporarily arrested or reversed.

The bags in such filters are commonly supported over skeleton frames or frames of foraminous material such as wire mesh and the beater bars are arranged to operate within the bags.

In order to obtain good dust separation from the bags when undergoing the cleaning process, it has been found that there must be close contact between beater bar or foraminous frame and bag during each stroke of the beater, so that the maximum shock is transmitted to the bag.

With conventional filter bags of substantially rectangular cross-section considerable separation between bag and frame occurs owing to the "ballooning" of the bag away from the frame under the internal pressure set up by the reverse flow or its possible slackness between lines of support.

According to the present invention either the cross-sections of the bag frames or the bag contacting parts of the beater bars are given a profile similar to the catenary-like curve adopted by the filter bags under internal pressure.

Put in another way the invention provides in filters of the kind referred to bag contacting means for the beating operation which have a curved profile similar to that adopted by the bag under internal pressure. In alternative forms the bag contacting means may comprise beater bars or a bag supporting frame agitated by beater bars.

Whichever expedient is adopted a considerably increased contact area is obtained at each stroke of the beater bars.

Where the frame of the bag is given a cross-sectional shape with a curve approximating to that adopted by the bag under pressure the distance between frame and bag under reverse flow is minimized and the localized shock of the beater bar striking frame is transmitted to a comparatively large area of the filter bag.

Where the beater bar is given a curved profile simulating that of the inflated bag on a longitudinal axis, as it "balloons" out over a skeleton frame, a somewhat similar result ensues, as the stretch of the bag under the blows produces a somewhat similar bulge even though there is no reverse flow in the case of an unsupported bag.

The bag adopts a catenary like curve both along its longitudinal and transverse axes, so that longitudinally arranged similarly curved beater bars can make contact over substantially the whole of their length and can transmit the maximum shock to the bag.

Other parts of the invention are embodied in one or other of two constructional forms of apparatus which will now be described in some detail by way of example with reference to the accompanying drawings:

Fig. 1 is a foreshortened side elevation of a bag and beater bar assembly,

Fig. 2 is a section on the line II—II of Fig. 1,

Fig. 3 is a foreshortened side elevation of an alternative bag and beater bar assembly, Fig. 4 is a section on the line IV—IV of Fig. 3, Fig. 5 is a plan view of the beater bar shown in Fig. 3, Fig. 6 is a section on the line VI—VI of Fig. 5.

In the first form a filter bag 1 designed for use in a dust recovery plant is stretched over a frame 2 of wire mesh which extends between an end plate 3 and up to a nozzle 4.

The nozzle has a cross-section which can be described as a narrow oval, it has semi-circular ends and two convex sides whose curve approximates that adopted by a filter bag of similar width when stretched over the frame and inflated. The distance between the ends is some ten times the maximum width between the sides in this particular form.

The end plate is of similar shape and dimensions to the nozzle. It has an inwardly extending flange around its periphery within which the end of the wire mesh frame is attached.

The end of the wire mesh entering the end plate is pinched in so that the general contour of the outside of the flange and the outer surface of the frame is kept smooth.

Side stiffener plates 5 and 6 are welded along each semi-circular edge of the frame so that the whole is rigid along its length.

Set bolts 7 and 8 for locating and fixing the complete frame in a filter casing are tack welded to the end cover plate 3 and pass through holes in the filter bag 1.

Bearing blocks 9 and 10 for a beater operating shaft 11 are provided at the centre of both nozzle and end plate.

There are two beater bars 12, 13 of circular cross section carried at the opposite ends of a pair of arms 14, 15 mounted on the operating shaft.

The operating shaft carries a crank 16 at the end extending through the nozzle by which it is given an oscillating motion by suitable mechanism (not shown).

In operation opposite sides of the wire mesh frame are struck simultaneously by first one and then the other of the beater bars.

As has been explained above the beating operation is performed with air flowing from the inside of the filter bags to the outside and dust separated from the bags by the shock transmitted through the mesh is carried away by the flow to collecting means.

Owing to the approximation of the curves of filter bag and frame during beating an enhanced separation of dust ensues for each stroke of the beater.

In the other form of apparatus illustrated in Figs. 3 to 6, the filter bag 20 is stretched over a frame of substantially rectangular cross-section and the beater bars 21, 22 are given a profile over their bag contacting surfaces similar to that given to the cross-section of the frames above described.

In this form, no foraminous material is used for the support of the bag 20 but the substantially rectangular frame is made up of a number of longitudinal ribs 23 supported between an end plate 24 and a nozzle 25; side stiffening plates 26 of semi-circular cross-section being provided at the narrow sides.

Bearing blocks 27, 28 and locating bolts 29, 30 are provided as in the form first described.

Two beater bars are provided and these are operated from a crank 31 on the operating shaft. In this case however the bars are given a catenary like curve along their bag contacting sides. In a typical example a beater bar is 22 inches long and has semi-circular ends of $\frac{3}{32}''$ radius, while the maximum width between its curved sides is 1 inch. The bar is a hollow section pressed from plate and is largely curvilinear in cross section so that no sharp edges contact the filter bag.

The operation of this form is similar to that above described, but in this case it is the approximation of the curve of the beater bar to that of the inflated bag on a longitudinal axis which gives the additional contact area and thus additional efficiency.

I claim:

1. In a dust collector filter of the type including a bag of narrow elongated cross-section and for arresting dust on its outer surface, a frame for supporting said bag at its side edges, said bag being adapted to be inflated by internal pressure for removing collected dust and by which the bag's sides are ballooned in a catenary-like curve between its edges, and beating means carried by said frame within the bag for engaging the sides of the bag and freeing the bag from dust by a beating operation, the improvement in said beating means of a curved profile on its bag-contacting surface substantially coinciding with the catenary-like curve adopted by the bag's sides under said internal pressure.

2. In a filter of the type set forth in claim 1 wherein said beater means comprises relatively stiff foraminous sides on said frame, said foraminous sides each having a catenary-like curved profile to snugly fit within the bag and substantially engage the bag sides, and means for vibrating said foraminous sides.

3. In a filter of the type set forth in claim 2 wherein said frame comprises respectively open and solid end members connected by curved edge plates to form a rectangular frame, said end members having catenary-like curved sides, and said foraminous sides being welded to said end members and edge plates to form a substantially rigid structure.

4. In a dust collector filter of the type including a bag of narrow elongated cross-section and for arresting dust on its outer surface, a frame for supporting said bag at its side edges, said bag being adapted to be inflated by internal pressure for removing collected dust and by which the bag's sides are ballooned in a catenary-like curve between its edges, and beating means carried by said frame within the bag for engaging the sides of the bag and freeing the bag from dust by a beating operation, the improvement in said beating means comprising a beater bar having a curved profile on its bag-contacting surface substantially coinciding with the catenary-like curve adopted by the bag's sides under said internal pressure.

GORDON H. VOKES.

REFERENCES CITED

The following references are of record in the file of this patent:

UNITED STATES PATENTS

| Number | Name | Date |
|---|---|---|
| 897,342 | Boegel | Sept. 1, 1908 |
| 2,072,906 | Rosenberger | Mar. 9, 1937 |
| 2,196,839 | Seng | Apr. 9, 1940 |

FOREIGN PATENTS

| Number | Country | Date |
|---|---|---|
| 14,004 | Great Britain | June 17, 1913 |